3,065,122
BONDING AGENTS

Howard H. Irvin, Gary, Ind., assignor to Borg-Warner Corporation, Chicago, Ill., a corporation of Illinois
No Drawing. Filed Aug. 14, 1956, Ser. No. 603,870
5 Claims. (Cl. 156—306)

This invention relates to new and improved bonding agents and methods for the employment thereof. More particularly, this invention relates to new and improved compositions for the bonding of elastomers to metals and methods for the employment thereof. In one specific aspect, this invention relates to new and improved compositions for the bonding of rubber to steel and methods for the application thereof.

Polyisocyanates, such as diisocyanates and triisocyanates, have been used for a considerable time as elastomer-to-metal bonding agents. However, these compounds react readily with the wide variety of compounds, including water, that contain an active hydrogen atom. The major disadvantage of polyisocyanates as elastomer-to-metal bonding agents resides in their extreme sensitivity to water vapor. The successful use of these compounds as bonding agents requires that they be protected from water vapor during storage, application and at least the early stages of curing which in turn requires very special and very critical handling techniques in the factory. Unless these bonding agents are rigorously protected from water vapor during storage, application and at least the early stages of the cure, the properties of the bonds produced by their use vary in a seemingly erratic fashion from very good to very bad.

I have discovered that certain thermally unstable derivatives of polyisocyanates are eminently suitable for use in the bonding of elastomers to metals.

One object of this invention is to provide a new and improved process for the bonding of elastomers to metals.

Another object of this invention is to provide a new and improved process for the bonding of rubbers to metals.

A further object of this invention is to provide a new and improved process for the bonding of rubbers to steel.

An additional object of this invention is to provide new and improved compositions for the bonding of elastomers to metals.

Other objects of this invention will become apparent as the description thereof proceeds.

By the interaction of the polyisocyanates, such as diisocyanates and triisocyanates, with the stoichiometric quantity of certain second reactants thermally unstable derivatives, frequently of the urethan structure, are produced. The resulting compounds do not react with water vapor or other sources of active hydrogen atoms but on heating decompose to regenerate the original polyisocyanate and the second reactant. By proper choice of the polyisocyanate and the second reactant it is possible to produce derivatives that decompose at temperatures conventionally employed to cure various elastomers, such as natural rubber, GR-S synthetic rubber, butadiene-acrylonitrile rubber, butyl rubber and neoprene. The new and improved bonding process of my invention will now be obvious. A film of a polyisocyanate derivative of the nature described is applied to the metal surface and/or to the surface of the uncured elastomer. The appropriate surfaces are then brought into intimate contact and the resulting assembly is subjected to the conventional cure required by the elastomer. Simultaneously with the elastomer curing process, the polyisocyanate derivative decomposes into the components employed in its formation and the polyisocyanate produced serves to react with and bond the cured elastomer to the metal surface. It is evident that operating in this way avoids the necessity of protecting the bonding agent from water vapor or other outside sources of active hydrogen since the actual bonding agent is not produced until the assembly has been heated to or near the elastomer curing temperature.

A similar bonding operation may be performed even though the elastomer employed does not require an independent cure. In such an operation, the elastomer-bonding agent-metal assembly is brought to the decomposition temperature of the polyisocyanate derivative, resulting in the regeneration of the polyisocyanate which reacts with and bonds the elastomer to the metal. However, it is obvious that the process involving simultaneous cure and bonding of the elastomer is of greater utility and accordingly is preferred over that involving the use of a precured elastomer or an elastomer that does not require a cure.

For the better understanding of this invention, complete descriptions of specific embodiments thereof are given. It is to be understood that these specific embodiments are illustrative only and the spirit and scope of this invention is not to be limited to the particular specific embodiments chosen for the purpose of illustrating the invention.

Example 1

Two hundred grams of a methylene chloride solution of tri-(p-isocyanyl phenyl) methane (triphenylmethane triisocyanate) (Desmodur R, Bayer; Mondur TM, Mobay Chemical Co.) were placed in a dry 500 ml. round bottom, three neck flask provided with a mercury sealed stirrer, a thermometer and a reflux condenser surmounted by a drying tube containing anhydrous calcium chloride. The solution contained 22% by weight or 44 g. (0.12 mole) of tri-(p-isocyanyl phenyl) methane. Thirty-four grams (0.36 mole) redistilled phenol and a small amount of pyridine (1.49 g., 0.019 mole) (to serve as a mild catalyst) were also added to the reaction flask.

As soon as the agitator was started a rather vigorous reaction began as evidenced by a rise in temperature of the contents of the flask which was controlled by the application of cooling during the first several minutes so as to keep the temperature below 35° C. When this initial somewhat vigorous reaction had subsided, the contents of the flask were carefully heated to reflux temperature (45–50° C.) and were maintained at reflux for 2.75 hours. At the end of this time, the reaction mixture was cooled to room temperature. The resulting solution of tri-(p-(phenoxy carbamyl)phenyl) methane having the structural formula

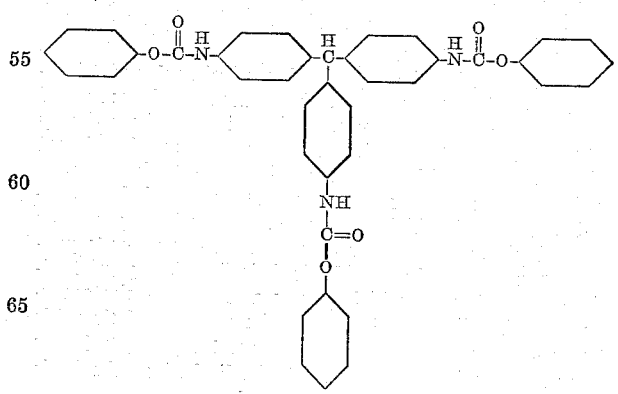

was quite viscous so the viscosity thereof was reduced by adding 30 ml. ethylene chloride thereto. No odor of phenol could be detected in the reaction product.

Example 2

A steel strip was cleaned by vapor blasting so as to produce a clean, dry surface and to this was applied (by brushing) a film of the tri-(p-(phenoxy carbamyl)phenyl) methane solution, prepared as described in Example 1. The resulting film was allowed to air dry for 20 minutes following which a layer of freshly sheeted, uncured natural rubber stock was pressed into intimate contact with the partially dried film on the steel surface. The resulting assembly was then cured at 307° F. for 20 minutes. After curing, the assembly was allowed to "rest" for 24 hours following which it was subjected to the strip test described in ASTM method D–429–55T, Method B. This test measures the force necessary to pull a rubber strip one inch wide from the metal. A strip adhesion of 70 pounds per inch was obtained.

Example 3

The procedure of Example 2 was followed with the exception that GR-S synthetic rubber stock was employed and the cure was at 307° F. for 25 minutes. A strip adhesion of 130 pounds per inch was obtained.

Example 4

The procedure of Example 2 was followed with the except that neoprene synthetic rubber stock was employed and the cure was at 307° F. for 25 minutes. A strip adhesion of 75 pounds per inch was obtained.

Example 5

The procedure of Example 1 was generally repeated except that a chloroform solution of Desmodur R (containing approximately 22% by weight Desmodur R) was employed. The quantities of reactants and catalyst were as set forth in Example 1 and after the initial rather vigorous reaction had subsided, the reaction was brought to completion by maintaining the contents of the reactor at 50° C. for 2.75 hours, under agitation. At the end of the reaction, 16.9 g. (0.12 mole) hexamethylenetetramine were added to the reaction mixture. During cooling to room temperature with stirring the hexamethylenetetramine dissolved. During this cooling, additional chloroform was added to the reaction mixture as necessary to give a final product of the desired viscosity (suitable for brush application).

When using the solution of this example as an elastomer-to-metal bonding agent in accordance with the procedures outlined in Examples 2 to 4 hereof, the resulting cured assemblies exhibited an appreciably greater strip adhesion than obtained in the absence of hexamethylenetetramine. The cured assemblies had a distinct odor of ammonia which soon disappeared due to diffusion of the gas into the atmosphere.

In the employment of the composition of this example as an elastomer-to-metal bonding agent, during the curing operation the tri-(p-(phenoxy carbamyl)phenyl) methane decomposes with the regeneration of phenol and tri-(p-isocyanyl phenyl) methane. This last named compound reacts with the elastomer, giving rise to the primary elastomer-to-metal bond. It is believed that the phenol formed reacts with the hexamethylenetetramine to produce a compound of the nature of hexamethylenetetramine triphenol which, under the elevated temperatures that obtain during the curing process, decomposes to produce ammonia and an insoluble, infusible C stage phenol-formaldehyde resin which acts as a secondary elastomer-to-metal bonding agent. It is to be understood that this explanation, while believed to be correct, represents theory only and the invention is not to be limited on the basis of any theoretical explanations set forth.

Similar blocked elastomer-to-metal bonding agents may be produced by the interaction of diisocyanates and phenol. Thus, the di-(phenoxy carbamyl) toluene having the structural formula

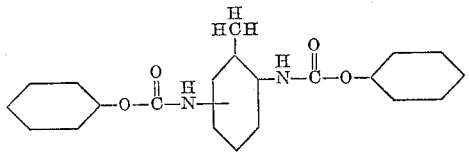

produced by the interaction of one mole toluene diisocyanate (Desmodur T) and two moles phenol may be employed as an elastomer-to-metal bonding agent, either alone or in conjunction with a potential source of methylene radicals such as hexamethylenetetramine. In general, it has been found that thermally unstable derivatives of diisocyanates are excellent for the bonding of neoprene type rubbers to metals but are somewhat less effective than analogous triisocyanate derivatives when natural rubber or GR-S type synthetic rubber is used.

Any monohydric phenol may be employed in producing the thermally unstable derivatives of polyisocyanates, such as phenol, the cresols, including mixtures thereof, the xylenols, including mixtures thereof, the phenyl phenols, tert-butylphenols, tert-amylphenols, and the like.

Suitable thermally unstable derivatives of polyisocyanates, such as diisocyanates and triisocyanates, may be prepared by the interaction of these materials with a number of other types of compounds in addition to the monohydric phenols. Thus, thermally unstable derivatives suitable for accomplishing the objects of this invention may be prepared by the interaction of polyisocyanates with compounds containing a methylene group, the hydrogens of which are activated due to attachment of the carbon atom of the methylene group to one or two highly negative groups, such compounds being exemplified by nitromethane, acetyl acetone, ethyl acetoacetate, diethyl malonate, 1-phenyl 3-methyl 5-pyrazolone, and the like. Also, thermally unstable derivatives of polyisocyanates such as diisocyanates and triisocyanates, suitable for accomplishing the objects of this invention, may be prepared by reacting these materials with diphenyl amine or with 2-methyl butyne-3-ol-2. In the inorganic field, polyisocyanate derivatives exhibiting the proper degree of thermal instability for accomplishing the objects of this invention may be produced by the interaction of polyisocyanates and sodium bisulfite. Any of these thermally unstable polyisocyanate derivatives may be employed as an elastomer-to-metal bonding agent in accordance with the teachings of this invention.

Be it remembered that while this invention has been described in connection with specific details and specific embodiments thereof, these details and embodiments are illustrative only and are not to be considered limitations on the spirit or scope of said invention except insofar as these may be incorporated in the appended claims.

I claim:

1. The manufacturing method comprising forming an elastomer-metal assembly with a film at the elastomer-metal interface, said film comprising the reaction product of a polyisocyanate and the stoichiometric quantity of a monohydric phenol admixed with a methylenating agent, heating the resulting assembly to a temperature sufficient to decompose the polyisocyanate derivative with the liberation of the polyisocyanate and the monohydric phenol, said polyisocyanate bonding said elastomer to the metal, and said monohydric phenol reacting with the methylenating agent to produce a C stage phenol-formaldehyde resin as a secondary elastomer-to-metal bonding agent.

2. The manufacturing method comprising forming an uncured elastomer-metal assembly with a film at the uncured elastomer-metal interface, said film comprising the reaction product of a polyisocyanate and the stoichiometric quantity of a monohydric phenol admixed with a methylenating agent, heating the resulting assembly to a temperature sufficient to cure the uncured elastomer and to decompose that polyisocyanate derivative with the liberation of the polyisocyanate and the monohydric phenol, said polyisocyanate bonding said elastomer to the metal, and said monohydric phenol reacting with the methylenating agent to produce a C stage phenol-formaldehyde resin as a secondary elastomer-to-metal bonding agent.

3. The manufacturing method comprising forming an uncured rubber-metal assembly with a film at the uncured rubber-metal interface, said film comprising the reaction product of a polyisocyanate and the stoichiometric quantity of a monohydric phenol admixed with a methylenating agent, heating the resulting assembly to a temperature sufficient to cure the uncured rubber and to decompose the polyisocyanate derivative with the liberation of the polyisocyanate and the monohydric phenol, and said polyisocyanate bonding said rubber to the metal, and allowing said monohydric phenol to react with the methylenating agent to produce a C stage phenol-formaldehyde resin as a secondary rubber-to-metal bonding agent.

4. The manufacturing method comprising forming an uncured rubber-metal assembly with a film at the uncured rubber-metal interface, said film comprising di-(phenoxy carbamyl) toluene and hexamethylenetetramine, heating the resulting assembly to a temperature sufficient to cure the uncured rubber and to decompose the di-(phenoxy carbamyl) toluene with the liberation of toluene diisocyanate and phenol, said toluene diisocyanate bonding said rubber to the metal, said phenol reacting with the hexamethylenetetramine to produce a C stage phenol-formaldehyde resin as a secondary rubber-to-metal bonding agent.

5. The manufacturing method comprising forming an uncured rubber-metal assembly with a film at the uncured rubber-metal interface, said film comprising tri-(p-(phenoxy carbamyl) phenyl) methane and hexamethylenetetramine, heating the resulting assembly to a temperature sufficient to cure the uncured rubber and to decompose the tri-(p-(phenoxy carbamyl) phenyl) methane with the liberation of tri-(p-isocyanyl phenyl) methane and phenol, said tri-(p-isocyanyl phenyl) methane bonding said rubber to the metal, and allowing said phenol reacting with the hexamethylenetetramine to produce a C stage phenol-formaldehyde resin as a secondary rubber-to-metal bonding agent.

References Cited in the file of this patent

UNITED STATES PATENTS

| | | |
|---|---|---|
| 1,250,959 | Brown | Dec. 25, 1917 |
| 2,284,637 | Catlin | June 2, 1942 |
| 2,430,479 | Pratt | Nov. 11, 1947 |
| 2,439,369 | Nicol | Apr. 6, 1948 |
| 2,451,963 | Loder | Oct. 19, 1948 |
| 2,466,404 | Fowler et al. | Apr. 5, 1949 |
| 2,563,113 | Hindin et al. | Aug. 7, 1951 |
| 2,711,383 | Ruggeri et al. | June 21, 1955 |
| 2,733,261 | Seeger et al. | Jan. 31, 1956 |

OTHER REFERENCES

Polyurethanes, by Dr. O. Bayer, translated from C.I.O.S. Report No. XXIX-12, by Chilton, London, C.I.O.S Target No 22/i(e), February 28, 1946, pp. 16, 20.

O.T.S. No. P.B. 23,858, pages 120–123 and 127, publ. July 26, 1946.

O.T.S. No. P.B. 32,161, Appendix VIII, pages 1–4 and 73, publ. September 6, 1946.

Meyrick et al.: "Polyisocyanates"; Transactions Institute Rubber Ind., vol. 25, No. 3, October 1949; pages 150, 151, 162, 163 and 164.

"Industrial Application of the Diisocyanates," by O. Bayer, publ. by Monsanto Chem. Co., St. Louis, Mo., March 1954, page 31.